US010019676B2

(12) United States Patent
Wolfe, Jr.

(10) Patent No.: US 10,019,676 B2
(45) Date of Patent: Jul. 10, 2018

(54) SYSTEM TO OPTIMIZE THE MAILING OF CONSTRUCTION NOTICES, LEGAL NOTICES, AND OTHER DOCUMENTS BASED ON BATCHES AND/OR DEADLINE DETERMINATIONS

(71) Applicant: Scott Gerard Wolfe, Jr., New Orleans, LA (US)

(72) Inventor: Scott Gerard Wolfe, Jr., New Orleans, LA (US)

(73) Assignee: Express Lien, Inc., New Orleans, LA (US)

( * ) Notice: Subject to any disclaimer, the term of this patent is extended or adjusted under 35 U.S.C. 154(b) by 560 days.

(21) Appl. No.: 14/103,987

(22) Filed: Dec. 12, 2013

(65) Prior Publication Data
US 2014/0172778 A1    Jun. 19, 2014

Related U.S. Application Data

(60) Provisional application No. 61/736,883, filed on Dec. 13, 2012.

(51) Int. Cl.
*G06Q 10/06*    (2012.01)
*G06Q 50/08*    (2012.01)

(52) U.S. Cl.
CPC .............. *G06Q 10/06* (2013.01); *G06Q 50/08* (2013.01)

(58) Field of Classification Search
None
See application file for complete search history.

(56) References Cited

U.S. PATENT DOCUMENTS

| | | | |
|---|---|---|---|
| 7,171,416 B2 * | 1/2007 | Kalmick | G06Q 10/02 705/75 |
| 7,783,658 B1 * | 8/2010 | Bayliss | G06F 17/30705 707/765 |
| 2009/0150906 A1 * | 6/2009 | Schmidt | G06F 17/30011 719/317 |

\* cited by examiner

*Primary Examiner* — Hosain Alam
*Assistant Examiner* — Tuan-Khanh Phan
(74) *Attorney, Agent, or Firm* — Marin Patents LP; Gustavo Marin

(57) ABSTRACT

A system and method to batch and collate construction notices, legal notices, and other documents by recipient, such that multiple notices can be sent in a single mailing, and to allow for these document batches to accumulate over time until the approaching of a deadline for the document's delivery.

7 Claims, 3 Drawing Sheets

Method and Process To Determine Applicability of a Deadline

Figure 1: Example Database Table Structure

1.1: Example Table Structure of Mail Items in A Queue

| | |
|---|---|
| Mail Record Item Identifier | int(10) |
| Mail Record Recipient | int(10) |
| Delivery Method | int(10) |
| Document Identifier for Document To Deliver | int(10) |
| Actual Document To Deliver | text (file, url reference, etc.) |
| User Identifier | int(10) |
| Affiliated Item Identifier | int(10) |
| Mailed | 0,1 |

1.2: Example Table Structure of Actual Calculated Deadlines

| | |
|---|---|
| Deadline Record Identifier | int(10) |
| Deadline | date |
| Affiliated Item Identifeir | int(10) |
| User Identifier | int(10) |
| Affiliated General Deadline Identifier | int(10) |
| Status | int(10) |

1.3: Example Table Structure of General Deadline Records

| | |
|---|---|
| General Deadline Identifier | int(10) |
| General Deadline Name | varchar(128) |

1.4: Example Table Structure For Document Records

| | |
|---|---|
| Document Identifiers | int(10) |
| Document Textual Name | varchar(128) |

1.5: Example Table Structure For Association of Document and Deadlines

| | |
|---|---|
| Document Identifier | int(10) |
| General Deadline Identifier | int(10) |

Figure 2: Adding Mailing Recordings Into Queue For Holding
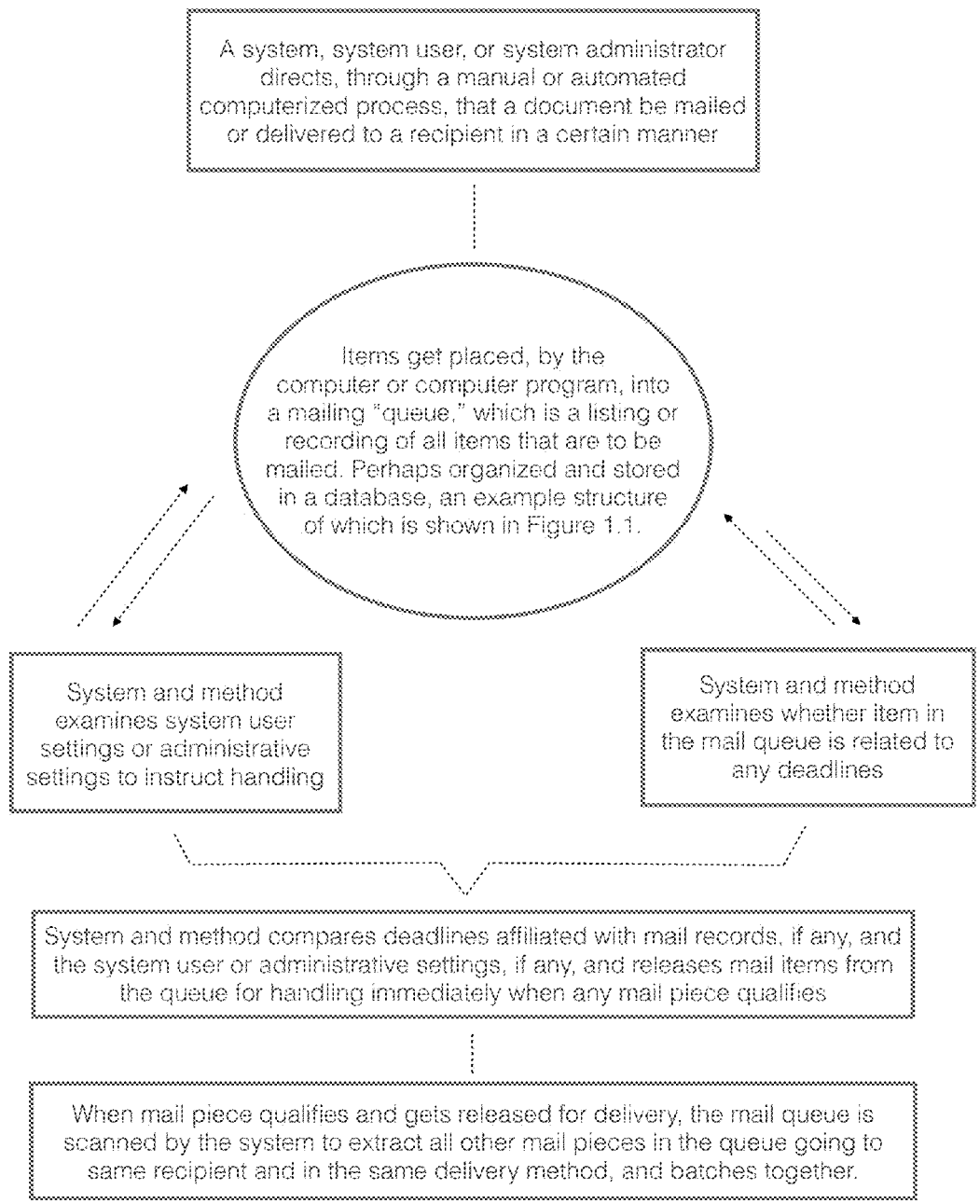

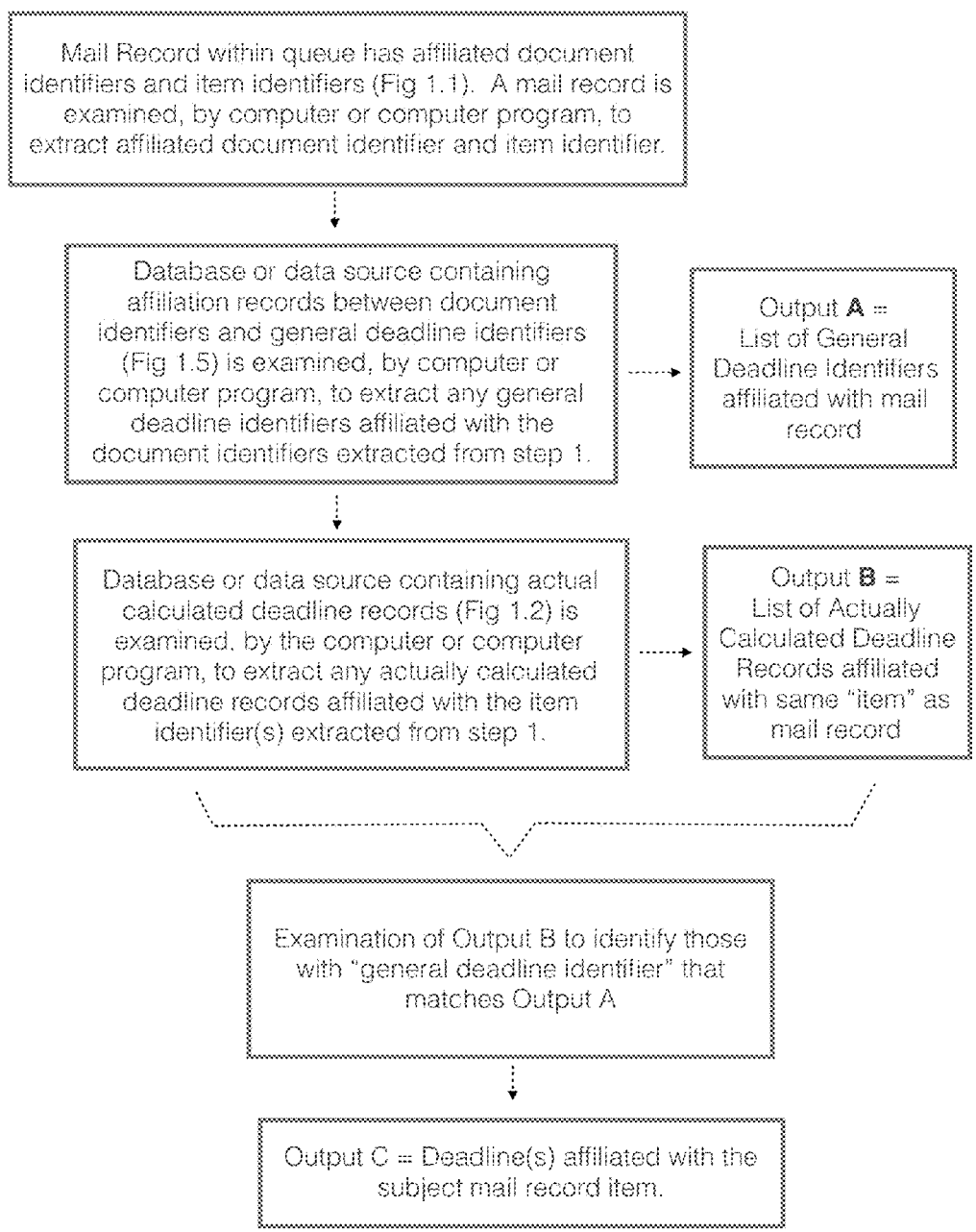
Figure 3: Method and Process To Determine Applicability of a Deadline

US 10,019,676 B2

SYSTEM TO OPTIMIZE THE MAILING OF CONSTRUCTION NOTICES, LEGAL NOTICES, AND OTHER DOCUMENTS BASED ON BATCHES AND/OR DEADLINE DETERMINATIONS

CROSS REFERENCE TO RELATED APPLICATIONS

This Nonprovisional Utility Patent Application claims the benefit of a previously filed provisional patent under 35 USC 199(e), the application number of which is 61/736,883.

STATEMENT REGARDING FEDERALLY SPONSORED RESEARCH OR DEVELOPMENT

Not applicable.

REFERENCE OF SEQUENCE LISTING, A TABLE, OR A COMPUTER PROGRAM LISTING COMPACT DISC APPENDIX

Not applicable.

BACKGROUND OF THE INVENTION

The present invention relates to the field of mechanics lien and bond claim compliance, and is specifically related to the delivery of legal notices required to preserve, comply with, perfect, or enhance a party's mechanics lien and/or bond claim rights.

These legal notices are generally required according to statutory rules, with the requirements for whether a legal notice is or is not mandatory heavily dependent on a variety of circumstances. When a legal notice is required, the legal notice must be delivered in a certain manner and to certain parties, which again, may depend heavily on a variety of circumstances. Furthermore, the notices must be delivered within a certain time period.

In addition to these specific legal notices, which are used as an example implementation of this invention, the present invention may also be applicable to other types of documents delivered by physical delivery, including, but not limited to, other required legal notices, demand letters, form letters, and other documents, and in some cases, documents that can be delivered through electronic delivery or transmission.

This invention, through a computer or computer program, uses a system and method to batch and collate construction notices, legal notices, and other documents by recipient, such that multiple notices can be sent in a single mailing, and to allow for these document batches to accumulate over time until the approaching of a deadline for the document's delivery.

SUMMARY OF THE ART

Mechanics Liens and Notices

Those furnishing labor, materials and/or services to private, state and federal construction projects around the United States have possible "mechanic's lien" claims in the event they are unpaid for their contribution. Popularly referred to as a "mechanic's lien," the legal remedy is also called a "claim of lien," "materialmen's lien," "property lien," "contractor lien," "construction lien," "statement of claim and privilege," "notice of claim of lien," and "stop work order." When the labor, materials or services are furnished to a construction project owned privately (non-governmental ownership), the lien is placed against the property itself. When the labor, materials or services are furnished to a state or federal construction project, a lien against the government owned property is typically not available, but instead a "lien" is made against a bond under the federal Miller Act or each individual state's "Little Miller Act." This lien remedy, which goes by many names and has different characteristics depending on the construction project's type, is referred to herein collectively as a "mechanic's lien."

While the ability to file a mechanic's lien is uniformly available across the United States and its territories, the laws regulating its filing differs from state-to-state. In addition to each state having unique mechanic's lien laws, within these laws different treatment is afforded to construction participants depending on their role in the project (i.e. original contractor, subcontractor, architect, supplier, equipment lessor, etc), their tier in the project (i.e. their place in the contractual chain starting from the property owner or public entity commissioning work) and the type of construction project where services are furnished (i.e. commercial, residential, owner-occupied residential, industrial, oil & gas, state, federal, etc.).

To preserve one's right to file a mechanics lien, many states require project participants to meet pre-lien statutory notice requirements. In some states, notices are required before services are provided, and in others notices are required within a certain period before the lien is filed. In other states, notices are not required at all. These notices must meet statutory requirements, and must be sent according to the state's statutory service or delivery standards. These construction notices, including, but are not limited to, notices of the following names and types: preliminary notices, pre-lien notices, notices to owner, notices of commencement, notices of intent to lien, notices of furnishing labor/materials, notices of lease, model disclosures, notices of completion or cessation, notices of lease, etc. Similar to a mechanic's lien, each state has specific requirements for how and when notices must be filed, served, or sent, to whom notices must be filed, served, or sent, and what must be included on the notice. These notices differ from mechanic's liens in that notices are only preliminary documents necessary to retain the right to claim a mechanic's lien at a later date, or optionally sent to notify or warn a recipient about the right to claim a mechanic's lien at a later date. The notices, collectively herein referred to as "preliminary notices" or "construction notices," where and when required, may be necessary to a claim a mechanic's lien, but are not sufficient, by themselves, for a mechanic's lien.

Each notice has specific and varied legal requirements, regarding who is to be given notice, how they must be given notice, and when the notice must be given. In some states, the notices are required to be given on a recurring basis for every month in which the potential lien claimants is unpaid for their work. The legal requirements for construction notices also vary by the role of the party giving notice (i.e. general contractor, subcontractor, material supplier, equipment lessor, etc.), as well as by the state in which the project was located, and the project type (i.e. commercial, residential, public, etc.).

The act of filing a mechanics lien is also subject to varied legal requirements, with each state setting forth specific elements required within a mechanic's lien. After a lien is filed, many states require the mechanic's lien be served upon certain parties through pre-defined methods.

Finally, the mechanic's lien is a temporary encumbrance on private property or a surety bond. The encumbrance lasts for a specific period of time as provided by each jurisdiction's statute, and the encumbrance expires at the end of this time period unless action is taken by the lien claimant. In some jurisdictions, the mechanic's lien claim may be "extended" through a supplemental filing. When unable to extend or further extend a lien, the mechanic's lien claim must be "foreclosed upon" by filing an action seeking foreclosure in a designated court of law.

As it currently stands, the practice of sending required notices and other construction documents is generally done on a piecemeal and one-at-a-time basis by the contractor, supplier, construction project participant, or third party notice preparation service (see below, "Construction Lien and Notice Services"). There is no standard for grouping and sending construction notices or other documents by the date which these construction notices or other documents must be sent. This invention will allow for the streamlining and optimization of the process of sending construction notices and/or other documents by grouping the documents in batches according to the date by which the construction notice or other document must be sent. This results in saved time and expense, as the time packaging the construction notices or other documents will decrease, and the expense in envelopes and postage will decrease.

Construction Projects and Participants

The construction industry is one of the largest industries in the United States, and includes a variety of parties who engage in the construction or alteration of any improvement projects.

Improvement projects may be of a variety of "types," which include residential projects, commercial projects, industrial projects, state owned projects or works, federally owned projects works, and more. Throughout this application, this will be referred to as a "project type."

A variety of parties participate in the construction or alteration of said improvement projects. Parties are identified by the roles they play on an improvement project, and may be classified as a developer or owner, a general contractor, construction manager, architect, engineer, subcontractor, trade contractor, supplier, sub-subcontractor, sub-sub-subcontractor, sub-sub-sub-subcontractor, equipment rental company or equipment lessor, lender, mortgagor, lien agent, or more. Throughout this application, this will be referred to as a "role."

Throughout this application, the project as a whole will be referred to as a "project" or "construction project."

Other Legal Notices, Form Letters, or Demand Letters:

Construction notices or preliminary notices is one type of statutorily required legal notice, however, there are a variety of legal notices that must be sent according to statutory requirements that depend on a variety of circumstances. Examples of legal notices include: Notices to vacate tenants, bank foreclosure notices, open account letters, collection demand letters, fair credit reporting act letters and notices, contractually required notices, service of process notices within legal proceedings or alternative dispute resolution proceedings, notices that must be sent by governing bodies to warn of government action, and more.

In all cases, statutory rules or case law dictates who must receive these notices, and how these notices must be delivered.

Web Applications, Product Ordering Interfaces, Mobile Applications, Widgets, Communications Networks:

The World Wide Web (WWW) is a well-known network of computers, whereby users around the world can access information displayed within a web browser. Typically the user accesses certain web pages that are displayed to the user through the HTML (Hyper-Text Markup Language) protocol. The user calls and retrieves specific HTML pages by requesting the page through a known URL (Uniform Resource Locator) using HTTP (HyperText Transfer Protocol).

Using certain computer languages such as PHP, Javascript, and HTML, listed here illustratively only and as examples, it has become common for companies and individuals to write applications that run and operate through web browsers on the World Wide Web. These web applications are similar to software applications that are written to operate on a user's desktop, except that they run through web browsers on the web.

Typically, a user will visit a certain website and be required to login to their account. Once logged in, the user will have access to the web application and its features. A web application can be designed to appear on a web browser access via a personal computer, or on a "mobile browser," which is a web browser optimized for viewing on a mobile device.

Although web applications viewing on a standard web browser may be viewed on a mobile device through a mobile web browser, mobile devices also have the ability to run native mobile applications. These applications are optimized to operate on a mobile device (such as an iPhone or iPad, or an Android OS device) with or without the use of an Internet connection. The user opens the application on his or her mobile device and is able to view, alter and interact with the application without the use of a browser.

Next, a Product Ordering Interface is an interface on the WWW that a user accesses through an HTTP request. Here, the user will find the ability to order certain products from the website, including, in the instance of this invention, mechanic's liens, bond claim forms, preliminary notices, lien cancellations, and similar products.

A popular Product Ordering Interface is the "shopping cart" model, whereby a purchaser selects an item from an electronic catalog, which is electronically added to the purchaser's "shopping cart", and when the purchaser is done selecting items all the orders in the shopping cart are "checked out" when the purchaser provides its billing and/or payment information.

Another Product Ordering Interface that is also popular is the less-sophisticated form-based system, whereby the purchaser selects the product or service through an electronic catalog of services or products, and is then forwarded to an online form where information about the purchaser (including, perhaps, the billing and payment information) is gathered.

Finally, a "widget" is a term of art defined by Wikipedia as "a small application that can be installed and executed within a web page by an end user." Or more further described therein as "a stand-alone application that can be embedded into third party sites by any user on a page where they have rights of authorship." Other terms used to describe web widgets include: portlet, gadget, badge, module, webjit, capsule, snippet, mini and flake.

A widget may be installed on any web page, displaying content to the viewer, or offering a certain application or function to the viewer. When an application or function is offered, the widget runs a script stored on the originating server, such that the viewer is able to complete a function within the widget without the host-site storing the function's code and framework.

For the purposes of this Specification, all of these applications, interfaces and networks, together with other non-discussed offline software systems and electronic communications, are collectively referred to as the "System" or "Application."

Deadline Calculators and Lien Deadline Information Databases

For quite some time, individuals and companies have offered resources to help construction participants understand and calculate the timeframe available to them to file construction notices, liens and bond claims across the country.

Most of these resources have been in paper format, simply separating the lien laws and lien law charts by state, and providing readers with a table of contents to the data. Some paper resources are more sophisticated, allowing users to move cardboard forms within a cardboard capsule so that a particular state will display in a carved out window; when a state is selected, that state's lien laws (or a summary thereof) will be displayed. An example device or paper resource to help calculate a deadline can be found in US Patent Application 20060069600 A1.

Still, however, the reader would have to decipher which laws apply to their particular station. Further, these lien law summaries are merely a compilation of the lien laws across the United States and its territories.

With the advent of computer software and the Internet, lien law resources have gotten a bit more usable.

Software users and web visitors have a few options where they can use computer databases to decode some of the lien law information. For instance, a user using one of these databases can select their state and be shown the general lien law in that state. In another instance, which is more specific, the user may use a software application to house detailed information about their construction project and the system will—after gathering all this project information—ask the user to provide generic work performance dates and/or answer pre-programmed questions about the project, and from all this information, display more specific database information about the construction project's applicable lien laws.

In addition to applications and database information systems that provide information about lien laws, there are a variety of generic date/deadline calculators in the marketplace. These calculators typically calculate a set number of days, months or years from a given date, and schedule notifications when the deadline approaches. An example generic date calculator is described in U.S. Pat. No. 8,140,605 B2.

Different arts have unique requirements for date calculating and the rendering of deadlines. The management of court dates and court dockets, for example, requires a lot of date and deadline management in a unique way. U.S. Pat. No. 7,171,416 B2 is an example of a method and apparatus to calculate court dates for a specific art ("calculating dates of different legal events capable of occurring in the course of a legal proceeding") based on the varying calculation rules of each court jurisdiction.

In the art of construction lien and bond claim deadlines, US Patent 20130185177 and US Patent 20130191255 provide for more specific functionality with regard to calculating construction lien, construction notice, and other construction document deadlines.

Construction Lien and Notices Services

Law firms, attorneys, form companies, software companies, legal document preparation companies, and similar service and product providers offer services or products to contractors, owners, suppliers, architects, engineers and other construction participants that aid them with filing construction lien and notices, and/or managing lien and bond claim compliance. Construction liens and notices are form-driven documents, meaning that when filed or delivered, they are simply forms filled-in with the applicable information. The form varies from state-to-state, and also varies depending on other factors related to a subject construction project, including, but not limited to, the "type" of project, the role that the party is engaged on the project, and their tier in the construction contracting chain.

The differences in the forms applicable to a party's particular circumstance depend on a large number of variables, which when spread across the country, creates a significant variety of form-types that can be used for all the different construction liens and notices that may be filed.

Many companies sell forms online or in paper format at retail locations, or over the Internet. The customer's experience is that the user searches for the type of form they need (without a significant degree of help or instruction), buy the form, and fill it in with the applicable information. The forms are static, and offered as packaged only.

Other companies, commonly known as legal document preparation companies or document automation companies, will collect information from the customer, and then fill-in the form for them. In the construction industry, and particularly with regard to construction liens and notices, it is also common for these companies to deliver or file the form after completion as part of the service. Some providers will fill in the information on the form manually for a customer, and others will use some type of software product or document automation tool to generate the document.

Attorneys and law firms offer legal advice and the preparation of legal documents, which may include the preparation of legal forms.

Finally, some companies sell software that will generate forms for the customer using document automation technology.

These services and service providers are distinguished from this Invention in that, while these service providers may have use for this Invention, they do not have a method and system, using a computer or computer program, for optimizing the process of sending construction notices, to batch and collate the same by recipient, such that multiple notices can be sent in a single mailing, and to allow for these document batches to accumulate over time until the approaching of a deadline for the document's delivery.

Physical Mail And Physical Delivery Management

Physical parcels of mail are delivered by a variety of vendors including the United States Postal Service (USPS), UPS, FederalExpress, DHL, and more. In regards to legal notices, such as construction notices, the method of delivery is restricted by the state's statutes. While some situations allow delivery through any third party courier service, the vast majority of jurisdictions require legal notices be delivered through the USPS.

Even further, when the USPS delivery is required, a state's law will typically mandate that the legal notice be delivered in some specific way through the USPS. In this regard, the USPS offers a variety of mailing services, including "certified mail," "registered mail," "certified mail return receipt," "registered mail with restricted delivery," etc. The services offered by the USPS vary from time-to-time.

In some cases, mailing labels or mailing envelopes can be generated from a delivery vendor (i.e. USPS, UPS) using tools made available by these vendors. These tools may be integrations with the vendor's application programming interface ("API"), or through some software offering.

Further, some vendors are available to perform mailing functions. The experience of working with these vendors is to deliver physical documents or electronic documents to the third party vendor with instructions on how to deliver the documents. The vendor will deliver the provided documents according to the delivery instructions.

Sorting these documents and managing the process of delivering the documents to the parties according to provided requests and instructions is the subject of many processes, including, for example, the process described in Patent Application WO 2011066562 A1, "System and method for creating an intelligent mail barcode." This invention is easily distinguished from these types of processes because it does not claim any processes related to the actual sorting, printing, packaging, mailing, delivery, and/or tracking of mail pieces.

Further, optimizing the mailing process for bulk mailers is the subject of prior art, such as Patent WO 2003096138 A2, which is a "Method of handling bulk mailing," or EP 1855251 A1, which is a "Method and system for processing batches of mail to increase efficiency of the mail stream," or EP 1671708 B1, which is the "Method for enhancing mail piece processing system."

These methods, however, relate to the optimization of mail handling after the mail pieces have been individually packaged and/or sent for mailing. The optimization suggestions in prior art, in other words, address the efficiency of the courier process, or the process of labeling individual mail pieces, sorting individual mail pieces, and the like.

The state of the art is not crowded currently in methods of optimizing the process of sending mail pieces before the pieces are labeled, packaged, and provided to a sorting facility or sorting function, and specifically with regard to collecting items that require mailing, examining them for similar features, and combining them into single mail parcels.

Further, the current state of the art lacks any optimization that contemplates the urgency of the documents themselves, such that some documents can be held to wait for others, and then combined into a batch when the urgency of the document increases.

BRIEF SUMMARY OF THE INVENTION

This invention, through a computer or computer program, is a system, method, and process of optimizing the sending of construction notices, legal notices, and other documents, by batching and collating the documents according to recipient, such that multiple notices may be sent in a single mailing; and further, the system, method and process, through a computer or computer program, contemplates enabling the batches to accumulate over a period of time while monitoring the urgency of each document. When a deadline for the document is approaching, the batch will be triggered for delivery.

The example use and implementation of this invention, referred to at great length through this application, is the sending of construction notices. In this example implementation, the invention is applicable to businesses (i) who prepare and send these construction notices for themselves (i.e. subcontractors, suppliers, etc.); (ii) who are in the business of preparing and sending these construction notices for other companies (i.e. Construction lien and notice companies; and (iii) who publish or use software and/or other tools, applications, or platforms to assist in the preparation and sending of construction notices (i.e. construction project management systems, notice and lien management system, document assembly tools, accounting applications, etc.).

Many of these applicable businesses send a great volume of construction notices, and because of the nature of the business and the notices, the documents are frequently sent to the same parties over and over again. There are two primary potential uses and benefits, therefore, to these applicable business.

First, because the notices are sent the same parties over and over again, by batching them together and including multiple documents in a single delivery, postage can be saved without compromising the legal rights afforded by the notice.

Second, since the notices have an expense, some applicable businesses may desire holding off on sending notices until immediately before a deadline, and by doing so, may nullify the need to send the notice because the account or project is closed and paid for in the interim making the notice irrelevant.

This invention contemplates assistance, use, and benefit for both scenarios.

While this example of construction notices is used as an example implementation of the invention, the invention can also be useful for the delivery of other legal notices. The invention is beneficial whenever: (i) notices are sent by a party so often that the notice recipients often repeat; and/or (ii) the notices must be sent according to some schedule or deadline, such that they may be considered to have different urgencies over time.

BRIEF DESCRIPTION OF DRAWINGS

FIG. 1 shows an example database table structure, within a computer system, for two potential database tables to implement this invention.

FIG. 1.1 provides an example table structure for mail items stored in a queue, with each record containing an unique identifier, and references to other existing database items, including the recipient of the mail record, the method of delivering the mail record, the actual item that should be mailed (which may be a file, reference to a file, or some other reference to the document that must get printed and delivered, or electronically delivered), identifier for the document itself (the document type or categorization), the system user affiliated with the record, and the "item" (i.e. the system user's project, property, account, or other item record, hereinafter referred to as an "item recored" or "item") affiliated with the record. All of this affiliated data is stored, by the computer program or computer system, within the computer program, database, system, and/or data source.

FIG. 1.2 provides an example table structure for deadlines stored in the computer system, database, or program. The calculated deadline stored in this example table structure can be calculated and determined using any method or system for calculating deadlines. Nevertheless, when the deadline is determined, it is stored in a database table, connected to a computer, with structure such as this example database table structure. As per the example, the deadline record has an unique identifier, records and stores the deadline itself, and affiliates the record with a system user identifier and an "item" identifier. Furthermore, the deadline is provided a "status," which will indicate whether the deadline is satisfied, active, inactive, or expired.

FIG. 1.3 provides an example partial database table structure for "general deadline records." Pursuant to this invention, documents are held in a batch, and may be released from the batch for delivery pursuant to the urgency of the document, or, in other words, pursuant to how close the document is to its deadline for delivery. As demonstrated in the above FIG. 1.2, the actual deadlines that are calculated using some method is stored in the database, and affiliated with a unique identifier and the system user and item. Likewise, the actual calculated deadline is affiliated with a "general deadline identifier." These general deadline identifiers are stored by the database as a "deadline type," and given their own unique identifier, as per this FIG. 1.3.

FIG. 1.4 provides an example partial database table structure for "document records." Pursuant to this invention, a requested, ordered, generated or otherwise obtained document is prepared for delivery to a recipient. For the purposes of this invention, the computer system, program, database, or data source, will contain some record of the document(s) capable of delivery. Pursuant to this FIG. 1.4, an example database structure indicates that the document have its own unique identifier.

FIG. 1.5 provides an example database table structure for the association of document records and general deadline records. Accordingly, pursuant to the FIG. 1.5 example, a computer database or data source contains entries with document identifiers and general deadline identifiers, such that each entry creates an association between these two elements.

FIG. 2 is a graphical representation of the method and process of this invention, whereby a system user, a system, or a system administrator, directs, through a computerized process, that a certain document be mailed or delivered to a certain recipient in a certain manner. This process can be performed in any manner and through any system or method, but when it does occur, this invention contemplates a "mailing record" getting created (FIG. 1.1), being put into a queue, and analyzed over and over again by the system and method to hold the mail piece until the urgency reaches a determined level. When the urgency mandates that the mail piece not be held any longer, the mail piece is released for delivery or handling, again, through any method, and this invention's method and system scans the mail queue to include any additional mail pieces in the queue that are related enough to be mailed together in a single mailing or delivery batch.

FIG. 3 is a graphical representation of the method and process to determine the applicability of a deadline to a particular mail record. This is an important part of this invention because for the computer program or system to utilize deadline information or urgency information about a document stored within a mail queue to determine how to handle the same, the computer process, system, or program must ascertain the deadline that applies to that document. This FIG. 3 graphical representation demonstrates an example method and process for the computer system or program to ascertain the applicability of a calculated deadline or urgency indicator by comparing the document record itself to its affiliated deadline records, within a computer database or data source, and any actually calculated deadlines.

DETAILED DESCRIPTION OF THE INVENTION

A. System and Method of Collecting Document Records in a Batch, Collating, and Releasing for Delivery Based on Recipient This invention relates to the field of mail processing and management, and specifically regards systems that perform some function resulting in the creation or collection of documents, and therein, collect or pool the documents into batches that require physical delivery to a recipient(s). The documents within the batches are processed by being printed by the system user through a function that properly collates the documents for easy or more convenient handling pre-mail, or transmits a batch file to a third party vendor to print, handle, sort, and mail.

This invention does not claim the underlying process of creating a batch file of data or documents, nor does it claim the process of printing, handling, fulfilling, and/or mailing any documents.

Instead, this invention's method performs a process, through a computer system, to collect and organize documents and data about its mailing requirements (i.e. the delivery method and recipient) into a batch file area, where the documents and mail records are held until a "release event." At the release event, the batch is organized and collated based on recipient and delivery method, to combine like records into single delivery requests or print files.

This component of the invention relates to this process of organizing the batch file area.

The batch file area of this invention is a holding area for mail records and document references. In any system that creates a batch file, the batch files collects data from various areas or moments, and puts all of those files, records, or references into a single file. This invention's "batch holding area" is simply the area where records are collected between the time when they are submitted into the queue for a batch, and when the batch is released.

FIG. 1.1 presents an example table structure of mail items in such a batch holding area, or queue, demonstrating an example implementation of this method using a computer database or data source. Each item in the holding area represents a physical document that requires physical delivery or mailing (or delivery by electronic transmission, if applicable). The records within the batch holding area contain an unique identifiers, and also references to: (i) the document's recipient; (ii) the delivery method; (iii) reference to the mailed item itself, i.e. location of a document file; (iv) the system user; (v) the system user's "item record" related to the mailing; and (vi) an indication of whether the item is or is not processed, mailed, or placed into a batch file.

This invention is a system and method of collecting these records into such a queue, and then from time to time, during a release event—which may be a timed and scheduled computer script, process, or cron job, or may be related to release events determined by the remaining sections of this invention—to remove qualifying items from the queue and place into a batch file for handling, processing, printing, and/or delivery.

This invention is a system and method of determining "qualifying items" to remove from the batch holding area, at each release event, and to place these items into the batch file.

A release event may be:
i. A scheduled script whereby everything in a batch holding area is pushed to a batch file, according to the schedule interval. In this event, everything in the batch holding area is pushed into a batch file at once, clearing the entire holding area of active items;
ii. A user or system preference, as contemplated in this invention, or holding all items in the batch holding area until the items urgency or deadline approaches a defined level, and thereafter, pushing the items with the urgency or approaching deadline only into the batch file, leaving the remainder of the batch holding area in hold until the next release event.

In the event of release event (i), everything in the batch holding area is pushed into a batch file at once, clearing the entire holding area of active items. In the event of release event (ii), only those items that are approaching the defined urgency or deadline marker are prodded to be added to the batch file, which leaves the batch holding area with the remainder of files (if any). In either release event, when the event occurs, this invention presents and method and system for finding qualifying items to add to the batch file, comprising the following steps:

a. Examining, by the computer or computer program, the item(s) in the batch holding area that are subject to the release event, and extracting and identifying, by the computer or computer program, the mail record recipient identifier(s) and the delivery method identifier(s), and thereafter:
   i. Examining and identifying, by the computer or computer program, all items in the batch holding area that are subject to the release event with matching recipient identifiers and delivery methods (i.e. different document or different mail record sending to the same party using the same method)
   ii. Examining and identifying, by the computer or computer program, the item(s) in the batch holding area that are not subject to the release event with matching recipient identifiers and delivery methods (i.e. different document or different mail record sending to the same party using the same method)
b. Creating, by the computer or computer program, a batch file containing all of the documents identified through part (a) above, whereby:
   iii. The computer or computer program combines all mail record items from the batch holding area that are being delivered to the same recipient using the same delivery method, such that the item in the created batch file contains an: (i) identifier; (ii) Identification of the recipient; (iii) Identification of the mail delivery method; (iv) A reference to each of the associated documents being sent to the recipient through the method, together; and (v) Any additional required data.

B. System and Method of Identifying Deadlines or Urgency for Deadlines in a Batch of Document Records Part A of this detailed description of the invention discusses the creation of a batch holding area containing records referencing documents and delivery instructions for the same, which are held until a "release event." Part C of this detailed description of the invention will discuss a system and method of creating such a release event based on the urgency or deadline of documents in a batch.

This Part B details a method and process of determining, by a computer or computer program, and based on the structure of data within the computer program, system, database, or data source, the urgency of a particular document referenced in such a batch holding area.

As per FIG. 1.1, and the discussion of the same within the discussion of drawings herein and the above Part A, the batch holding area stores data, within a computer system, file, program, database, or data source, of individual records referencing documents that will be subject to a delivery. Each of these records within the batch holding area contains:
   i)i) A reference to the document itself;
   i)ii) A reference to the method of delivery;
   i)iii) A reference to the delivery recipient;
   i)iv) A reference to the affiliated "item record"

Determination of a subject document's urgency or deadline requires a system and method of referring to other data within the computer program, database or data source related to the document. Example database or data source table structure to create the relationship between critical data for this function is shown in FIG. 1. A method and process of using this related data to determine the applicability of a deadline to a record within a batch holding area is demonstrated within FIG. 3.

The method and system of analyzing, by the computer or computer program, data within the system, program, database, or data source, to determine the applicability of a deadline to a document referenced within a batch holding area and awaiting some delivery comprises the following steps:

a. Examining a record within the batch holding area, by the computer or computer program, and:
   i) Extracting the document identifier within the item. This may or may not be reference to the actual document file that requires delivery, but instead, refers to some characterization of the document. As demonstrated in FIG. 1.4, documents within the contemplated system are identified within the same as having a certain 'type' or category. Each document delivered and referred to within the batch holding area, according to this method, will be related to or identified as some general document type, which contains an identifying integer stored within the database, data source, or program. This subpart contemplates the extraction of the document identifier within the mail record item held in the batch holding area.
   ii) Extracting the associated item identifier within the record. The "item" is the system user's project, property, account, or other item record, hereinafter referred to as "item record" or "item." Each mail record within the batch holding area will relate to some item associated with the system user.
b. Examining, by the computer or computer program, the database or data source to identify and accumulate certain affiliated data related to the mail record item being examined within this method and system, including:
   i) Examining, by the computer program or computer, a data source containing an affiliation between document identifiers (described in subpart (a)(ii) supra) and general deadline identifiers—which, like document identifiers, are a labeling or categorization of potential deadline types or urgency markers, which are stored within the computer database, program, or data source, and are associated with each calculated deadline or urgency marker. An example of this affiliation between document labels and deadline labels is demonstrated by an example table structure in FIG. 1.5.—and extracting any general deadline identifiers that are affiliated with the document identifiers extracted by the process explained in the above step (a)(i).
   ii) Examining, by the computer program or computer, a data source containing actual deadline records or urgency markers related to system users—such deadlines or urgency markers can be created, calculated, and stored using any method whatsoever, and an example of the storage of such actually created deadlines can be found in FIG. 1.2, which is an example table structure of actual calculated deadlines—and extracting any actually calculated deadline records within the program, database, or data source that are affiliated with the item identifiers extracted by the process explained in the above step (a)(ii).

c. Examining, by the computer or computer program, the identifiers extracted by subpart (b)(ii), and identifying from these records, the "general deadline identifier" associated therewith;

d. Examining and Determining, by the computer or computer program, whether any of the general deadline identifiers identified in subpart (c) match the general deadline identifiers identified and extracted by subpart (b)(i);

e. Concluding, by the computer or computer program, that the actual deadline record(s) that match through subpart (d)'s examination and determination is the deadline record(s) affiliated with the subject mail record within the batch holding area being examined within this process.

C. System and Method of Adjusting the Release of Document Records from a Batch, as per the above Part A, Based on the Deadlines or Urgency of Items in Batch, as determined by Part B or Otherwise Part A of this detailed description of the invention discusses the creation of a batch holding area containing records referencing documents and delivery instructions for the same, which are held until a "release event." Part B of this detailed description of the invention discusses the method and process of determining, by a computer or computer program, and based on the structure of data within the computer program, system, database or data source, the urgency of a particular document referenced in such a batch holding area.

This Part C discuss a system and method of creating such a release event based on the urgency or deadline of documents in a batch.

FIG. 2 provides a graphical demonstration of this process of creating a dynamic release event. The method and system of examining the batch holding area, evaluating deadlines, and using this data to create a release event, all by the computer or computer program, comprises the following steps:

a. Examining, by the computer or computer program, the mail records within a batch file or batch holding area, and extracting—using the process described in the above Part B or any process or method whatsoever—any deadlines or urgency markers indicating the due date or urgency of transmitting the document associated with that particular mail record;

b. Triggering, by the computer or computer program, according to a certain and defined period of time in reference to the determined deadline or urgency marker (i.e. _____ days before the deadline, or _____ days before urgency marker is a certain character) a release event to create an output of the items within the batch holding area.

What is claimed is:

1. A method for managing documents in a batch holding area comprising:

a document batching computer comprising at least a database and program code, the program code stored in the database and running on the computer, the program code configured to manage documents in the batch holding area comprising the steps of:

storing a plurality of individual records referencing one or more documents, each individual record comprises, at least, a recipient identifier and a delivery method identifier;

upon a release event:

examining the plurality of individual records to determine at least a portion of the plurality of individual records that are subject to release;

identifying a matching set of individual records from at least a portion of the plurality of individual records wherein each recipient identifier and each delivery method identifier of the at least portion of the plurality of individual records match;

creating an output file from the plurality of the matching set of individual records;

assigning a unique identifier to the output file;

identifying a recipient from a first recipient identifier from the matching set of individual records of the output file;

identifying a delivery method from a first delivery method identifier from the matching set of individual records of the output file;

creating a batch file comprising a plurality of document references, each document reference corresponding to an individual record of the matching set of individual records;

clearing at least a portion of the plurality of individual records that correspond to the matching set of individual records.

2. The method of claim 1, further comprising the step of sending the output file to the recipient via the delivery method.

3. The method of claim 2, wherein the release event is triggered by an event selected from the group consisting of a deadline, a CRON job, a script, a user preference, and a system determination.

4. The method of claim 3, wherein a delivery, using the delivery method, of the matching set of individual records is not performed until, at least, the release event.

5. The method of claim 1, wherein the output file is a collated document comprising the matching set of individual records.

6. The method of claim 1, wherein for the matching set of individual records, each individual record, associated recipient identifier, and associated delivery method identifier is capable to be accessed from an application programming interface.

7. The method of claim 1, further comprising the step of transmitting the output file through electronic mail.

* * * * *